United States Patent
Mundy et al.

(10) Patent No.: US 6,700,668 B2
(45) Date of Patent: Mar. 2, 2004

(54) METHOD OF MEASURING A PART WITH A WIDE RANGE OF SURFACE REFLECTIVITIES

(75) Inventors: Joseph LeGrand Mundy, Niskayuna, NY (US); Kevin George Harding, Niskayuna, NY (US); Joseph Benjamin Ross, Cincinnati, OH (US); Thomas Watkins Lloyd, Shrewsbury, VT (US)

(73) Assignee: General Electric Company, Niskayuna, NY (US)

( * ) Notice: Subject to any disclaimer, the term of this patent is extended or adjusted under 35 U.S.C. 154(b) by 18 days.

(21) Appl. No.: 10/064,246

(22) Filed: Jun. 25, 2002

(65) Prior Publication Data

US 2003/0234941 A1 Dec. 25, 2003

(51) Int. Cl.⁷ .............................................. G01B 11/24
(52) U.S. Cl. ...................... 356/601; 356/394; 382/321
(58) Field of Search ............................. 356/601, 614, 356/237.1, 394, 445–448; 382/321, 172; 702/167, 190; 250/559.22

(56) References Cited

U.S. PATENT DOCUMENTS

| 4,284,356 A | | 8/1981 | Heilman |
| 4,349,277 A | | 9/1982 | Mundy et al. |
| 4,528,455 A | * | 7/1985 | Loose ................... 250/559.49 |
| 4,533,828 A | | 8/1985 | DiMatteo et al. |
| 4,709,156 A | * | 11/1987 | Murphy et al. ........ 250/559.22 |
| 4,908,782 A | * | 3/1990 | Pekarek et al. ............. 702/167 |
| 4,963,036 A | | 10/1990 | Drisko et al. |
| 5,146,293 A | * | 9/1992 | Mercer et al. ............... 356/512 |
| 5,625,446 A | | 4/1997 | Bedard |
| 6,211,506 B1 | * | 4/2001 | Pryor et al. ............... 250/208.1 |

* cited by examiner

Primary Examiner—Hoa Q. Pham
(74) Attorney, Agent, or Firm—Jean K. Testa; Patrick K. Patnode

(57) ABSTRACT

A method for optical part shape measurement of a bare metal part to determine acceptability of the manufactured part. A variable level light source illuminates the part which is mounted on positioning equipment that allows the part to be moved from one position to another. Localized variations in light level are first determined and are compared with a reflectivity model of the part to determine optimization of the setup. Light level and viewing orientation of the part are adjusted to optimize the quality of test data obtained. Data quality is reviewed to ascertain a confidence factor for each location on the part's surface. Using both the reflectivity model and quality test results, data acquired for specified areas of the part is either accepted or rejected. Light level and part orientation are changed based upon how a reflectivity map of the part changes with each adjustment. New and acceptable data are now acquired for those areas of the part where data was previously discarded. This new acceptable data is combined with the previously acceptable data to obtain a complete set of data upon which acceptability of the part is determined.

14 Claims, 3 Drawing Sheets

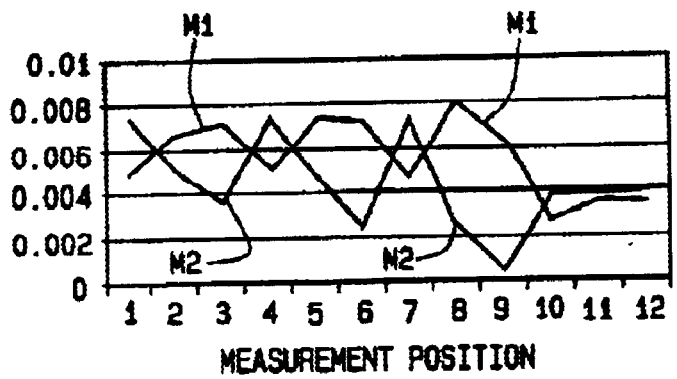
FIG. 4A
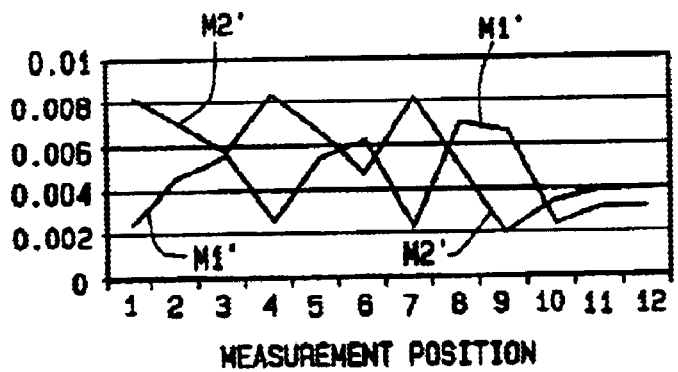
FIG. 4B
| A | A | A | A | A | A | A | A |
|---|---|---|---|---|---|---|---|
| A | A | A | A | A | A | A | A |
| 000 | 000 | 001 | A | A | A | A | A |
| 001 | 000 | 001 | A | A | A | A | A |
| 001 | 002 | 001 | A | A | A | 255 | 254 |
| A | A | A | A | A | A | 254 | 255 |
| A | A | A | A | A | A | 254 | 255 |
| A | A | A | A | A | A | A | A |
| A | A | A | A | A | A | A | A |
FIG. 5A

METHOD OF MEASURING A PART WITH A WIDE RANGE OF SURFACE REFLECTIVITIES

BACKGROUND OF INVENTION

The invention relates to the testing of uncoated, shiny metal, prismatic parts such as turbine blades used in aircraft engines, and more particularly, to a method of such testing using a three-dimensional, optical measurement system. Turbine blades, or other shiny articles, measured using optical based measurement systems typically demonstrate a wide range of light reflectivity characteristics. These range from very diffuse at one end of the spectrum to extremely specular at the other. Current optical based measurement systems attempt to get around problems created by changes in reflectivity over the surface of the part by having the part first coated with a light diffusing material. Various paints and powders known in the art are used for this purpose. The object of the coating is to produce more uniformity in the light reflectivity characteristics (i.e., narrow the range) than with an uncoated test specimen.

While this approach has some advantages, there are numerous disadvantages as well. Applying a paint or powder to the part adds an additional step (with its associated cost) to the testing-procedure. Next, once the test is complete, the powder or paint must be removed, and-once removed, disposed of. This adds additional steps and cost to the test procedure. The overall result of the paint/coating process is to increase the time required to conduct a test and accordingly reduce the throughput of parts to be tested. Another problem is the dispersion of powder throughout the test setup. Fine powders tend to migrate everywhere and can get into sensitive test equipment potentially effecting the quality of test results. How the powder or paint is disposed of may also create environmental problems.

The present invention enables metal parts to conveniently and accurately tested without having to first be coated. The method allows for accurate testing of bare metal parts conveniently and without the problems attendant with the above described procedure.

SUMMARY OF INVENTION

Briefly stated, the method of the present invention facilitates part shape measurement of a bare metal part such as a turbine blade using light gauging techniques, so to insure the acceptability of the manufactured part. A variable level light source illuminates the part which is mounted on positioning equipment that allows the part to be moved from one position to another. Localized variations in light level are first determined. These values are compared with a reflectivity model of the part and the light level and viewing orientation of the part are adjusted to optimize the quality of test data obtained. The data quality is reviewed to ascertain a confidence factor for each data point or test area on the surface of the part. Using both the reflectivity model and the quality of the test results, data acquired for each region on the part's surface is either accepted or rejected. Areas for which the data is rejected are ,now masked and the light level and/or part orientation is changed based upon how a reflectivity map of the part changes with each adjustment. This permits new and acceptable data to be acquired for those areas of the part for which data was previously rejected. The now acceptable data is combined with the previously acceptable data to obtain a complete set of data by which acceptability of the part is determined. The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification:

FIG. 4A is a graph for reflection variations across the blade of FIG. 3 when the blade is at one viewing angle, and FIG. 4B is a similar graph for the blade oriented at a different viewing angle; and, FIGS. 5A–5C is a simplified illustration of the use of masking to obtain usable test data for part evaluation.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
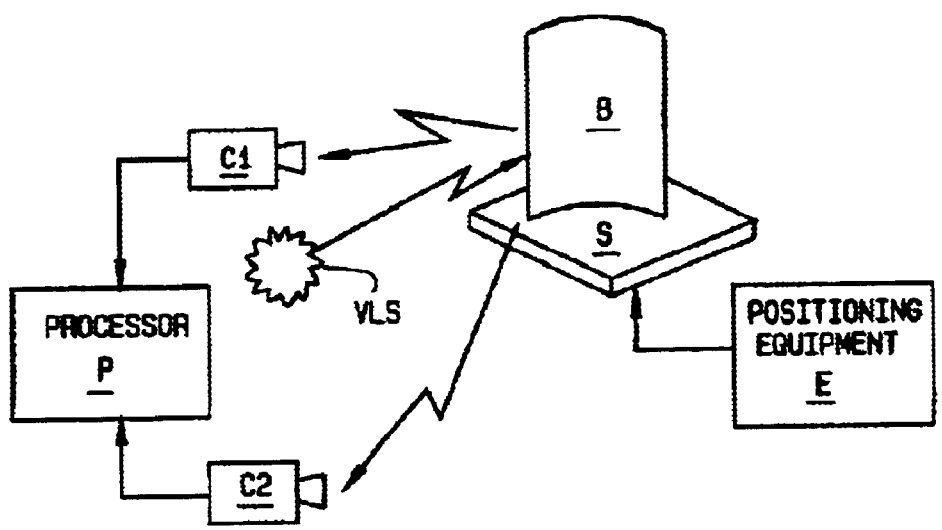
FIG. 1 illustrates an airfoil mounted on a base movable by positioning equipment to place the part in desired position.
Figure 2:
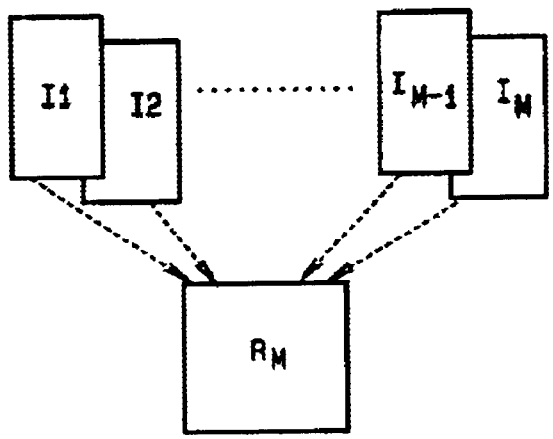
FIG. 2 represents a series of images for the part under test taken for different part positions and light intensity levels, and,a reflectivity map of the part with which the images are compared.

In accordance with method of the present invention for determining the acceptability of a three-dimensional object, FIG. 1 illustrates a turbine blade B mounted on a platform or base support S. The blade has a complex shape and a surface which is continuous over the part. The base is attached to a positioning equipment E by which the base and accordingly the blade can be rotated or moved from one viewing angle (position P1) to another viewing angle (position P2). Those skilled in the art will understand that equipment E can move the blade through a series of viewing angles as desired by the test operator. A variable level light source VLS, which is preferably a laser stripe projector, has the intensity of its light output controlled by the test operator. This is done in accordance with localized variations in light intensity which are first measured as part of the setup procedure. When energized, the light source illuminates the part while cameras C1 and C2 obtain images of the part.

The images are processed by a processor P. The processor converts each image into a pixel array with each pixel representing a location on the surface of the part. The individual pixels comprising the array are each assigned a value representing the intensity of light reflected from the part at the respective location.

As previously discussed, the blade is a bare metal (uncoated) part and it is desirable for the reasons noted above to be able to test the part without having to coat or paint it. To do so, it is important to be able to position the part, and control the intensity of light directed at the part, so to obtain processed pixel information usable in evaluating its acceptability. In this regard, processor P processes a series of images $I1$-$I_m$ taken for part at different viewing angles, different levels of light intensity, generating more or fewer light stripes, and different camera gains. Processor P compares the data acquired for each viewing angle and light intensity level with a reflectivity model Rm of the blade. This reflectivity model is based upon the known geometry of the part. The acquired intensity data is used to determine differences between the reflectivity model Rm and the actual reflected light seen in the images. The difference between the acquired data and reflectivity model Rm is then used too evaluate the setup. At this time, the part is not being tested for acceptance or non-acceptance, but rather to determine which set of test criteria (viewing angle and light intensity level) provides the best setup for testing parts. This is particularly important during manufacturing operations where a number of similar parts are to be tested.

Figure 3:
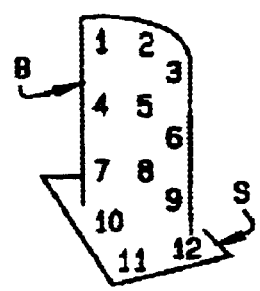
FIG. 3 is a simplified representation of a blade with various test locations identified thereon.

FIGS. 3, 4A, and 4B illustrate the above described procedure. In FIG. 3, blade B is shown to have a number of measurement regions indicated 1–12. In FIG. 4A, reflection variations across the blade are graphed for the blade when at one viewing angle. There are two plots on the graph. Plot M1 represents reflection when the blade is viewed from one camera C1 or C2, and plot M2 when the blade is viewed by the other camera. FIG. 46 is a similar graph for reflection variations when the blade is at another viewing angle. The respective plots are designated M1' and M2' in FIG. 48. In viewing these Figs., it will be noted that in FIG. 4A, the value for region 9 in plot M2 is very low. This indicates that there is a low light level for this region and that this viewing angle for the blade is probably not acceptable. However, in FIG. 4B, the value for the same measurement region is significantly higher, while the overall range of values for both plots is between 0.002 and 0.008. Analysis of these two graphs means that the blade in the position for which the plots in FIG. 4B were acquired is preferable to that of the other blade position.

Once an optimal set of conditions are determined, a confidence level can be established with respect to gauge repeatability and reliability. Since blade B has a complex three-dimensional part shape, reflection variations such as shown in FIGS. 4A and 4B are to be expected it may be possible, as shown in FIG. 4B to identify a set of test parameters which will provide the necessary confidence level for part testing. However, in some circumstances that may not be possible. In such instances, the method of the present invention provides a procedure for obtaining values which meet the confidence level requirements for testing the part.

Figures 5B, 5C:
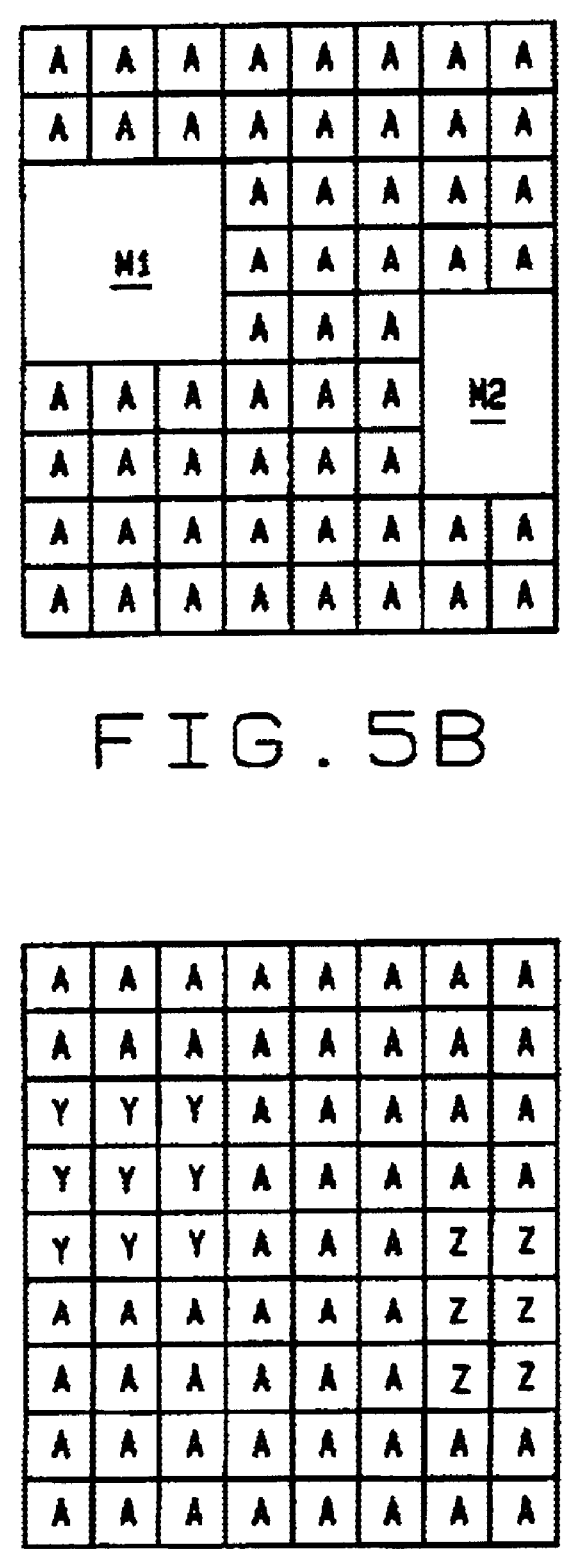

In the conventional Grey Scale, pixel values range from 000 to 255. At the low end of the scale, little or no light is being reflected from a particular region (region 9 in FIGS. 3 and 4A) on the part's surface, while at the high end of the scale, too much light is being reflected. As discussed, what is required is a set of test conditions for which the range of Grey scale values over the; part provides the requisite confidence level. In FIG. 5A, a portion of the blade's surface is represented. Each block in the Fig. represents a separate pixel comprising an image of the blade processed by processor P. Those pixel locations where the pixel values are within an acceptable range are indicated A. Those locations where the values are at or near 000 and 255are also indicated. In accordance with the invention, these regions are now masked as indicated at K1 and K2 in FIG. 5B.

To fill in these blanks, various techniques are employed. For example, the intensity level of the light source is changed, camera gain is adjusted, etc. New images of the part are taken and processed and the resulting pixel values evaluated for the masked areas to determine if they no longer fall at the extreme ends of the scale. If they do, the adjustment process is repeated. However, once the pixels for the masked area fall within an acceptable range, these values are substituted into the respective pixel locations and the unacceptable data is discarded. This is as shown in FIG. 5C.

It will be understood by those skilled in the art that if there is more than one masked region to be addressed, no one new set of parameters may result in all the regions being acceptable. Accordingly, a series of adjustments may be necessary before all the masked regions are filled in with acceptable data. Thus, in FIG. 5C, satisfactory pixel values obtained for masked region K1 are indicated Y, while those obtained for region K2 are indicated Z.

When all the blanks are filled in, a complete surface map of the part can now be drawn, the surface being continuous over the entire part. This surface map is then compared to a reference map for the part to determine the part's acceptability.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method of optical part shape measurement of a bare metal part to determine acceptability of the part, comprising:
    illuminating the surface of the part with a variable level light source; measuring light level values over the illuminated part and comparing data represented by the light level values with a reflectivity model of the part;
    determining whether or not to accept light level values for various regions on the part's surface and discarding the data for a region if a sufficiently high confidence level with respect to the data for that region cannot be reached;
    masking each region on the part for which data is discarded; and, changing the intensity of the light level with which the part is illuminated and acquiring new data for each masked region, the new data now being compared with the reflectivity model of the part and if a sufficiently high confidence level with respect to the new data can now be reached, replacing the discarded data for that area with the newly acquired data whereby acceptance of the part is based upon acceptable data for the entire part.

2. The method of claim 1 in which the part is mounted on positioning equipment by which the part to be moved from one position to another position, and the method further includes repositioning the part, as well as changing the intensity of the light level to obtain acceptable data for masked regions of the part.

3. The method of claim 2 further including initially varying orientation of the part and adjusting the intensity of the light level to obtain acceptable data for substantially most of the part.

4. The method of claim 3 in which initially varying orientation of the part and adjusting the intensity of the light level includes locating the part position and light intensity level which produces the smallest range in variation of the data over the surface of the part.

5. The method of claim 1 further including determining the acceptability of the part only after acceptable data is obtained for the entire surface of the part.

6. The method of claim 1 in which the part is illuminated with a laser stripe projector (VLS) and viewed with a plurality of cameras.

7. A method for measuring the surface of an uncoated metal part having a complex part shape comprising:

mounting the part on a movable support;

illuminating the part with a light having a variable intensity and capturing images of the part when moved to different positions and illuminated with different levels of light;

processing the images to obtain data representing a pixel value for each location on the part's surface;

comparing the processed images with a reflectivity map of the part to determine which part position and which light intensity level provides sufficient data on which acceptability of the part can be determined;

identifying those regions on the part in which light reflected from the part is so diffuse or so specular that data obtained for those regions cannot be used in part acceptability determination;

masking those regions of the part for which the data cannot be used;

varying both the position of the part and the light intensity level to obtain new data for those regions which is acceptable; and, replacing the data for those regions which cannot be used with the acceptable data whereby the acceptability of the part can now be determined.

8. The method of claim 7 in which initially moving the part to different positions and varying the intensity of the light level includes locating the part position and light intensity level which produces the smallest range in variation of the data over the surface of the part.

9. The method of claim 8 in which the part is illuminated with a laser stripe projector and viewed with a plurality of cameras.

10. Apparatus for measuring the surface of an uncoated metal part having a complex part shape comprising:

a base on which the part is mounted and means for moving the part from one position to another;

a variable intensity light source illuminating the part;

at least one camera capturing images of the part in its different positions; and when illuminated with different levels of light; and, a processor processing the images to obtain data representing a pixel value for each location on the part's surface, the processor comparing processed images with a reflectivity map of the part to determine which part position and which light intensity level provides sufficient data on which acceptability of the part can be determined.

11. The apparatus of claim 10 wherein the processor further identifies those regions on the part in which light reflected from the part is so diffuse or so specular that data obtained for those regions cannot be used in part acceptability determination.

12. The apparatus of claim 11 in which the processor masks those regions of the part for which the data cannot be used, the position of the part and the light intensity level now being varied by the respective moving means and light source to obtain new data for those regions which is useful for determining part acceptability, the processor replacing the data for those regions which cannot be used with the new data whereby the acceptability of the part can now be determined.

13. The apparatus of claim 10 in which the moving means moves the part to different positions and the intensity of the light level of the light source is also varied so to locate a part position and light intensity level which produces the smallest range in variation of the data over the surface of the part.

14. The apparatus of claim 13 wherein the light source is a laser stripe projector and a plurality of cameras view the illuminated part.

* * * * *